Sept. 10, 1968      J. J. DI VIETRI      3,400,870

COMBINATION BELT TIGHTENING AND HANDLE DEVICE

Filed April 7, 1967

INVENTOR.
JOHN J. DI VIETRI

BY

*Edward S. Levy*

ATTORNEY

United States Patent Office 3,400,870
Patented Sept. 10, 1968

3,400,870
COMBINATION BELT TIGHTENING
AND HANDLE DEVICE
John J. Di Vietri, 652 88th St.,
Brooklyn, N.Y. 11228
Filed Apr. 7, 1967, Ser. No. 629,289
5 Claims. (Cl. 224—58)

ABSTRACT OF THE DISCLOSURE

A device for tightening a belt about an article and serving as a handle for transporting the article in the form of a unitary body having an elongated central shank terminating at each end in an angularly inclined arm. One of the arms has a pair of spaced slots through which the belt may be threaded, and for forming vertically-spaced bights in the belt when the device is turned to a position in which the arms rest upon the article or the belt thereon and position the shank spaced above and parallel to the luggage in position to serve as a handle. The other arm has retaining means for releasably locking said arm to the belt.

---

The device of the invention is primarily intended for use in applying final tightening to a belt or strap securing an article or load upon a dolly or other load carrier transporting the article upon a ground surface. Where an article is mounted on such dolly by means of a belt extending from the dolly around the article, the belt is conventionally hand-tightened and secured by means of a toothed buckle or the like. In many instances, it is impossible to obtain the proper belt tension to maintain the article securely upon the dolly during transporting.

Proper tensioning of the belt is particularly desirable where the dolly is of the type disclosed in my copending U.S. Patent application Ser. No. 501,186, filed Oct. 22, 1965, now Patent No. 3,329,442. This type of dolly is provided with means for gripping the article resting thereon, which gripping means is caused to press upon the article by the tightening of the belt about the article. If the belt is not sufficiently tightened, the gripping means does not hold the article in proper position upon the dolly.

The device of the present invention is particularly adapted for use in conjunction with the load transporting device of my aforementioned copending application by applying a final and effective tightening of the belt about the load and also by serving as a handle for transporting the load. It may, however, also be advantageously employed in conjunction with any type dolly or load transporting device, or, in fact, for the tightening of any belt or strap about an object.

Accordingly, it is a principal object of the present invention to provide a combination belt tightening device and handle of the character described which may be easily and conveniently employed to tighten belt sections about a load in a final operation to grip the load securely and efficiently.

Another object of the invention is to provide a device of the character described which includes handle means to allow simple guidance of the load along a ground surface.

Another object of the invention is the provision of a combination device of the character described in which relatively simple means are provided to engage and releasably lock the belt with the free end of the device.

A further object of the invention is to provide a device of the character described which comprises a unitary structure which may be made in one piece, providing economy of manufacture.

A further object of the invention is to provide a device of the character described which employs a simple leverage action in providing an efficient belt tensioning function, so that it is simple in operation and requires relatively little effort in use.

In accordance with the invention there is provided a combination belt tightener and handle device having a central shank portion from which extends two angularly and symmetrically disposed arms. One of the arms contains a pair of spaced slots through which the belt is threaded. This arm is flat so that it may be initially placed flat upon the article around which the belt extends, and said arm also has a bearing edge about which the device may be pivoted to a position in which both angular arms rest upon the article. During this pivoting movement, said arm forms a pair of spaced bights in the belt which tensions the belt about the article. The opposite arm has a recess therein sized to receive a portion of the belt for maintaining the device in its tightening position. A finger overlies a portion of the open end of the recess for holding the engaged belt portion within the recess, whereby the device may be used as a handle.

Additional objects and advantages of the invention will become apparent during the course of the following specification when taken in connection with the accompanying drawings in which.

Figure 2:
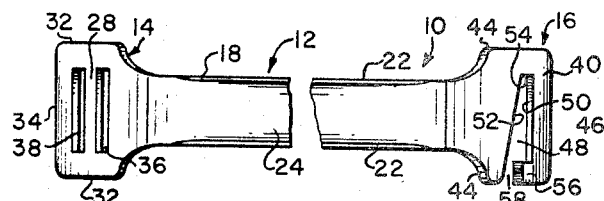
FIG. 2 is a top plan view of the belt tightener and handle device shown in FIG. 1.
Figure 3:
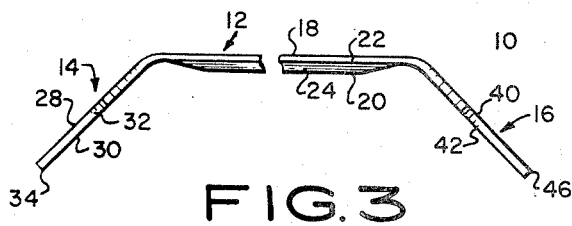
FIG. 3 is a side elevational view thereof.

Referring in detail to the drawings, and in particular to FIGS. 2 and 3 thereof, there is shown a combination belt tightener and handle device 10 made in accordance with the present invention and generally comprising a unitary body in the nature of a central elongated shank 12 terminating at its ends in a pair of arms 14 and 16 disposed angularly to the plane of shank 12. The body of device 10 may be made of aluminum or other durable, light weight, and shock-resistant material. Preferably the body is made in one piece from metal, stamped and bent into the flat form shown in the drawings.

Figure 1:
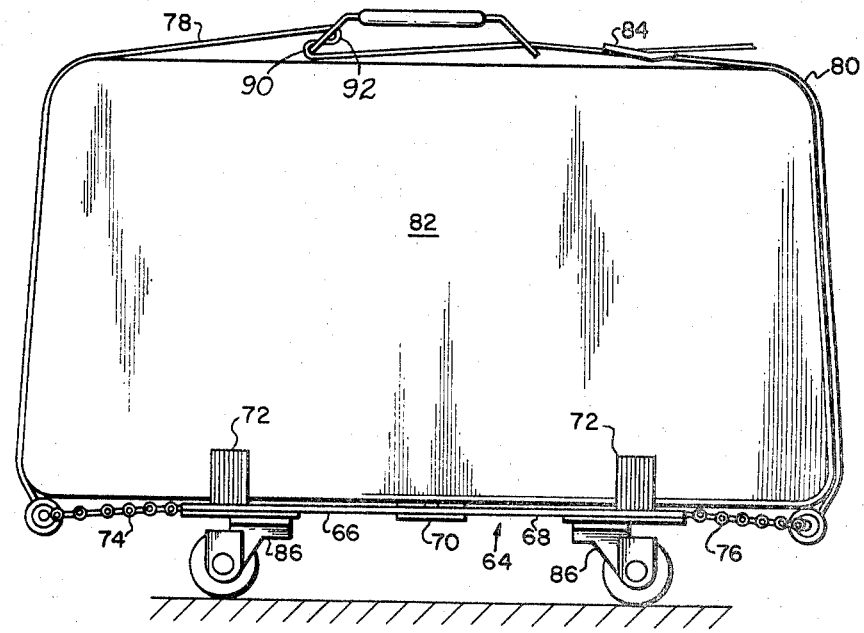
FIG. 1 is a side elevational view showing a belt tightener and handle device of the present invention in operative position tightening the belt sections about an article of luggage mounted on a load transporting device.
Figure 4:
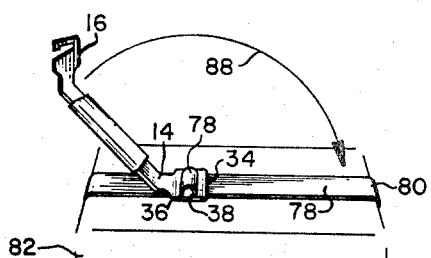
FIG. 4 is a perspective view showing the device mounted on a belt extending about an article, prior to turning the device to its belt tightening position.
Figure 5:
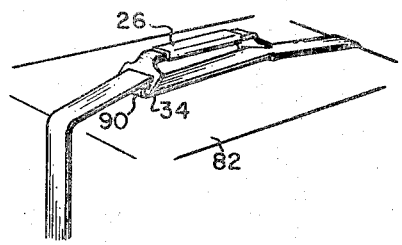
FIG. 5 is a perspective view of the device mounted on a belt extending about an article, after the device has been turned to its operative position and in its initial stage of locking the free end thereof to the belt.

More particularly, the shank 12 is defined by an upper surface 18 and an opposed lower surface 20, bounded by narrow side edges 22. The upper and lower surfaces 18 and 20 may be flat, or may be downwardly curved to form a depressed groove or channel 24, as shown in FIGS. 2 and 3. In either flat or grooved form, the shank 12 may be provided with a sleeve 26, as shown in FIGS. 1, 4 and 5. The purpose of the channel or the sleeve is to provide a comfortable and efficient hand-grip for the shank when the device is used as a handle as will be described.

The arms 14, 16 are of identical size and shape, being wider than shank 12, and extending from said shank at identical inclinations from the plane thereof so as to form a symmetrical body. Thus, when the arms 14, 16 are rested upon a surface, they support the shank 12 spaced above and parallel to said surface. In one commercial embodiment, each of the arms 14 and 16 was disposed at an angle of 35° to the shank 12. The arm 14 is defined by a flat upper surface 28, a flat lower surface 30, side edges 32, and an end or bearing edge 34. Cut out of the arm 14 are a pair of spaced, parallel openings defining an inner slot 36 and an outer slot 38. The slots 36 and 38 are elongated and substantially rectangular, and are of sufficient size to permit the belt or strap employed to be threaded therethrough.

The opposite arm 16 is defined by a flat upper surface 40, a flat lower surface 42, side edges 44, and an end edge 46. Formed in the arm 16 is an elongated tapered recess 48 having an edge 50 arranged substantially parallel to the end edge 46, an opposed edge 52, and a relatively narrow inner edge 54. The edge 52 extends from end edge 54 to the side edge 44 of arm 14 and is angularly disposed at an inward inclination from edge 54 to edge 44. The edge 50 is of a length to accommodate the width of the belt employed, and terminates in an inwardly-projecting finger 56 which provides a restricted throat 58 for recess 48, which throat 58 opens through end wall 44 and is offset from recess edge 50.

In operation, the handle member 10 is threaded upon a belt or strap which is extended upon an object to be transported and which has independent securing means. The belt or strap is first hand tightened about the object by means of a buckle or other securing means, and the handle device is then turned to effect final tightening of the belt around the object, and is locked in place to serve as a handle for transporting the object.

The handle device is particularly intended for use with portable load carriers or dollies which are adapted to mount pieces of luggage or the like by means of a strap or belt extending around the luggage. In FIG. 1 by way of example, there is shown a load-transporting device 64 of the type fully shown and described in my copending U.S. patent application Ser. No. 501,186, filed Oct. 22, 1965.

The device 64 has pairs of opposed flat arm members 66, 68 pivotally mounted on a central plate 70 and each having an upstanding gripping arm 72 at its outer end. The ends of each pair of arm members 66 and 68 are connected by respective chains 74 and 76, to the centers of each of which are looped to the ends of respective belt sections 78 and 80. These belt sections 78 and 80 are sized to be extended around an article of luggage 82 or similar article and fastened therearound by a buckle 84. The arm members 66, 68 are mounted on casters 86 for rolling the mounted article over a floor surface.

As described in my aforesaid copending application, when the belt sections 78 and 80 are tensioned, they draw the chains 74, 76 outwardly, which in turn draws the pairs of arm members 66 and 68 inwardly toward each other, and causes the upstanding gripping arms 72 to press firmly against and tightly grip the side walls of the article of luggage 82. Since the handle member 10 of the present invention provides a final tightening of the belt, when used in conjunction with the load transporting device 64, the handle member effects a firm gripping action of the device 64 upon the load.

FIGS. 4 and 5 show the manner in which the handle member 10 is used in tightening a belt about the luggage article 82. The belt section 78 is brought up to the top surface of the article 82 and is threaded through the slots 36, 38 of the handle member 10. This threading is accomplished by holding the arm 14 in a horizontal position with the arm 16 elevated, and passing the belt section 78 upwardly through the slot 36 and then downwardly through the slot 38, in a manner shown in FIG. 4. The belt section 78 is then engaged with the toothed buckle 84 carried by the belt section 80, and the belt hand tightened and secured by the buckle. In this position, the arm 14 of handle member 10 is held flat upon the upper surface of the article 82, with the shank 12 and arm 16 elevated as shown in FIG. 4.

The shank portion 12 is then grasped and the handle device 10 turned in a direction to lower the arm 16 into engagement with the article 82, that is in the direction shown by arrow 88 in FIG. 4. In this turning movement, the handle member 10 pivots about the end bearing edge 34 of arm 14, so that the arm 14 revolves through an obtuse angle from the horizontal position of FIG. 4 to the forwardly and upwardly inclined position of FIG. 5. As arm 14 revolves, its end bearing edge 34 moves rearwardly along the belt section 78 forming a rearwardly-extending bight 90 therein. At the same time, a bight 92 is formed in the portion of belt section 78 which extends between the slots 36, 38, and this bight 92 is carried forwardly of bight 90. The formation of those two vertically-spaced bights 90, 92 drawing up any slack remaining in the belt sections, and tightening the belt securely about the luggage article 82.

Upon completion of the aforementioned pivoting operation, the arm 16 is moved laterally until it is out of the plane of belt section 78 with its end edge 46 resting upon the surface of article 82 and with the belt located adjacent to and facing the restricted throat 58 of recess 48, as shown in FIG. 5. The arm 16 is then moved laterally toward the belt section, causing the belt to pass through throat 58 and pass fully into recess 48, wherein it comes to rest against the edge 50. The finger 56 overlies the outer edge of the belt to prevent its moving laterally out of the recess 48, and the member 10 is thus releasably locked in operative position to serve as a handle for transporting the article 82, and for maintaining tension on the belt. In this position the inclined arms 14 and 16 hold the shank 12 spaced from and parallel to the top surface of the article of luggage 82 so that it may be conveniently grasped as a handle.

It will be appreciated that the retaining finger 56 allows a positive means for maintaining the belt within the recess 48 for as long as required. When the user wishes to disengage the device, all that is necessary is that he lift the edge of the belt within the recess 48, pass it over the top of the finger 56, move the arm 16 transversely out of the plane of the belt, and then pivot the handle member 10 back to the position of FIG. 4.

It is to be understood that in addition to use in providing final tightening and handle means for articles of luggage, the device of the instant invention may be employed for tightening belts or straps extended about other heavy loads or articles, such as cartons, crates and the like.

While a preferred embodiment of the invention has been shown and described herein, it is obvious that numerous omissions, changes and additions may be made in such embodiment without departing from the spirit and scope of the invention.

What is claimed is:

1. A combined belt-tightening device and handle for attachment to a belt extending about an article, said device comprising a unitary body member including a central elongated shank, and a pair of inclined arms extending outwardly and downwardly from opposite ends of said shank, and having upper and lower surfaces, a pair of spaced parallel slots in a first of said arms extending through and between said upper and lower surfaces, said slots being elongated in a direction normal to the axis of said central shank and sized for receiving said belt therethrough in a direction in longitudinal alignment with said shank for mounting said device on said belt, and retaining means on the second of said arms engageable with said belt for releasably locking said second arm to said belt.

2. A combined belt-tightening device and handle according to claim 1 in which said first arm is flat and has a planar end edge spaced from and parallel to the adjacent slot of said pair of slots, said device when mounted on said belt being disposed in an intial position in which said first arm extends along the surface of said article with said central shank and second arm projecting outwardly from said surface, said device being then pivotable about said end edge of the first arm to an operative position in which a bight in said belt is formed about said end edge whereby to effect final tightening of said belt about said article.

3. A combined belt-tightening device and handle according to claim 2 in which said retaining means of second arm is located in engagement with said belt in said operative position of the device, whereby said second arm may be locked to said belt and said device is in position to be used as a handle with both arms projecting angularly from the surface of said article and said central shank substantially parallel to and spaced from said surface.

4. A combined belt-tightening device and handle according to claim 1 in which said retaining means comprises an open ended recess in said second arm of sufficient length to receive said belt therethrough.

5. A combined belt-tightening device and handle according to claim 4 in which said recess is tapered outwardly toward its open end in one side wall of said second arm, and in which a finger covers over a portion of said open end to provide a restricted throat for passage of said belt into and out of said recess.

References Cited
UNITED STATES PATENTS

| | | | |
|---|---|---|---|
| 384,558 | 6/1888 | Bridwell | 224—56 |
| 779,691 | 1/1905 | Comstock | 224—56 |

HUGO O. SCHULZ, *Primary Examiner.*